United States Patent [19]
Richmond

[11] Patent Number: 5,669,331
[45] Date of Patent: Sep. 23, 1997

[54] ANIMAL CARRIER

[76] Inventor: Edward Richmond, 3551 Caribeth Dr., Encino, Calif. 91436

[21] Appl. No.: 489,559

[22] Filed: Jun. 12, 1995

[51] Int. Cl.$^6$ ..................................................... A01K 1/03
[52] U.S. Cl. ......................................................... 119/497
[58] Field of Search ............................... 119/431, 452, 119/453, 459, 461, 473, 474, 482, 491, 492, 496, 497, 498, 499, 502, 504, 512, 513, 514

[56] References Cited

U.S. PATENT DOCUMENTS

| | | | |
|---|---|---|---|
| 844,955 | 2/1907 | Morgan | 119/474 X |
| 3,048,147 | 8/1962 | McKean. | |
| 3,195,506 | 7/1965 | Beard | 119/496 |
| 3,896,766 | 7/1975 | Martin | 119/474 |
| 4,484,450 | 11/1984 | Yamamoto | 119/498 X |
| 4,603,658 | 8/1986 | Garnsey. | |
| 4,903,637 | 2/1990 | Devault. | |
| 5,010,848 | 4/1991 | Rankin. | |
| 5,016,570 | 5/1991 | Henson. | |
| 5,522,344 | 6/1996 | DeMurjian | 119/474 |
| 5,549,073 | 8/1996 | Askins et al. | 119/461 X |

FOREIGN PATENT DOCUMENTS

| | | | |
|---|---|---|---|
| 2183983 | 6/1987 | United Kingdom | 119/461 |

*Primary Examiner*—Thomas Price
*Attorney, Agent, or Firm*—Ellsworth R. Roston

[57] ABSTRACT

A pet housing expansible to hold a pet and collapsible to suitcase size for manual transport includes a pair of platforms and first and second pairs of spaced walls. The walls in the first pair (e.g. front and rear walls) are pivotably attached at opposite ends to the platforms and are hinged at intermediate positions for collapse and expansion. The walls in the second pair (e.g. side walls) are pivotable toward an individual one of the platforms with the platform as a fulcrum to collapse the housing and toward the other platform to expand the housing. In the collapsed housing disposition, detents on opposite sides of the hinge on the first pair of walls releasably engage to maintain the housing collapsed. A manually grippable handle on one of the platforms provides for a transport of the collapsed housing. With the walls in the first pair expanded, detents on the walls in the first and second pairs of housings releasably engage to maintain the expanded housing enclosure. A second handle on one of the platforms is manually grippable to provide for the housing transport in the expanded relationship. Third detents provide for a releasable closing and opening, preferably on a vertical axis, of a door in one of the second pair of walls. The walls in the first and second pairs are preferably formed from gratings of spaced wires to minimize weight and to provide a circulation of air through the housing from the atmosphere in the expanded housing.

43 Claims, 7 Drawing Sheets

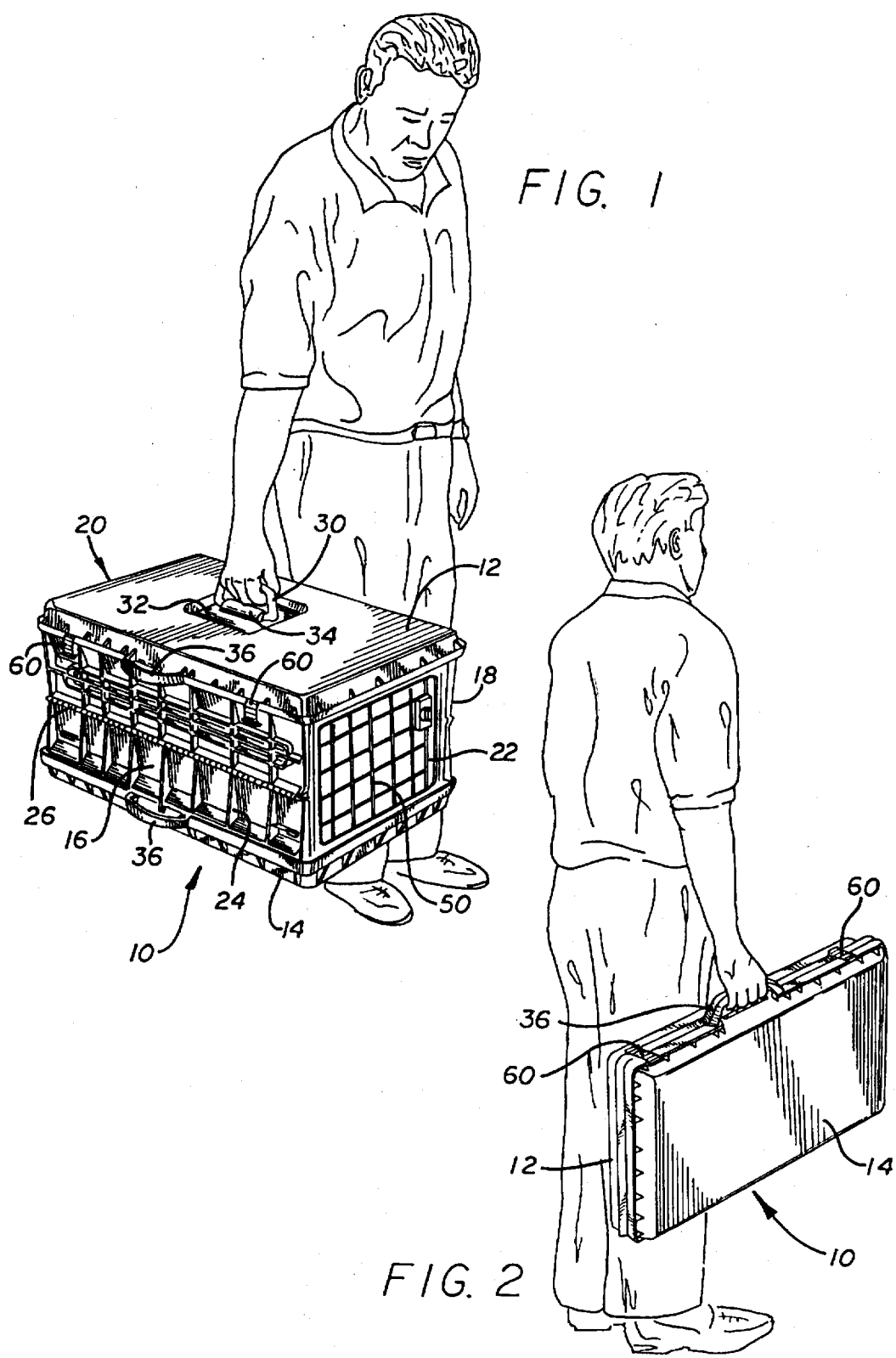

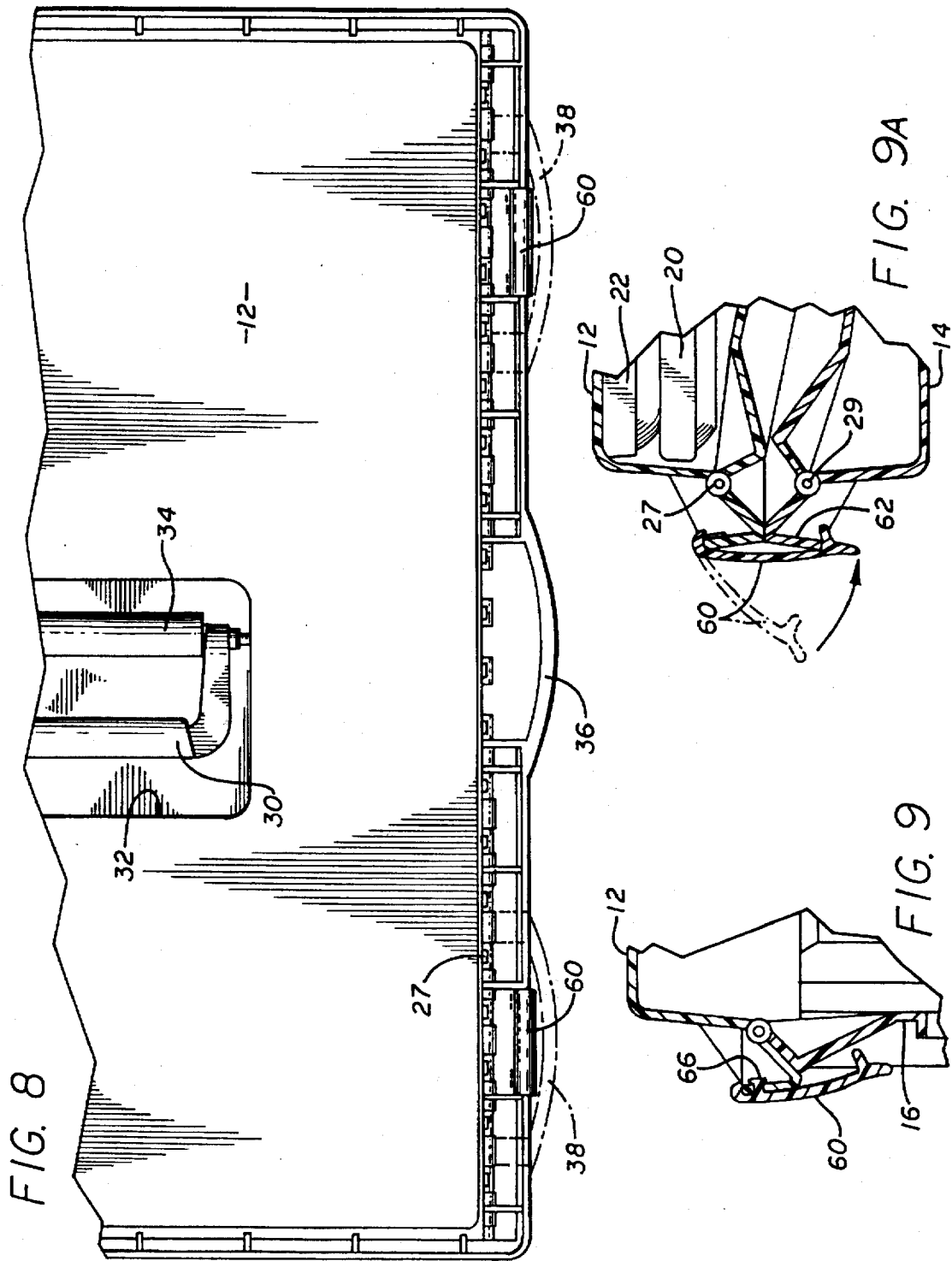

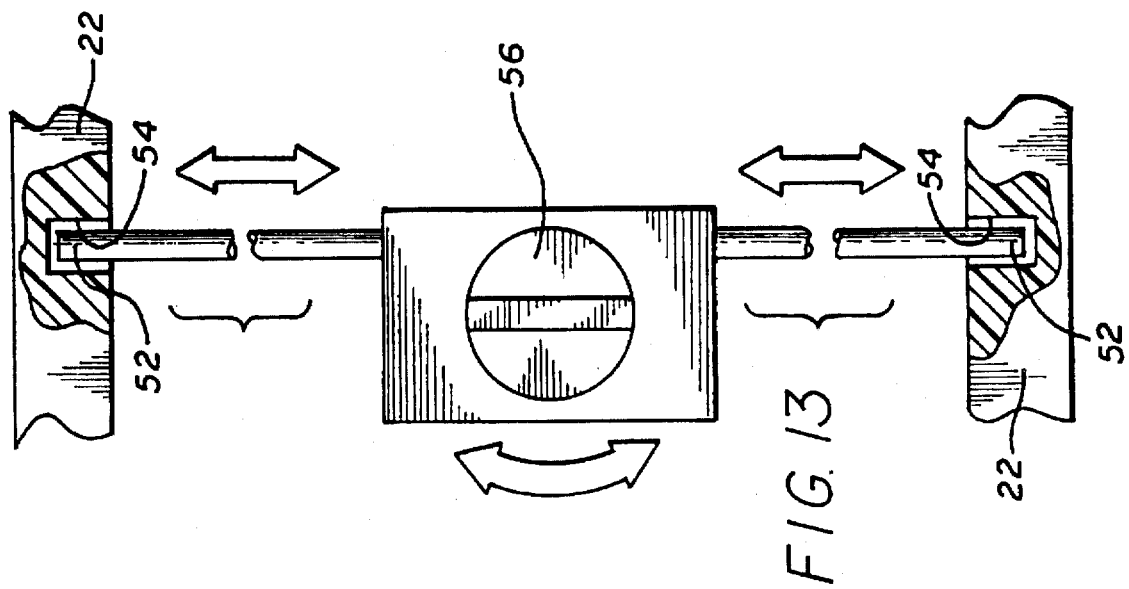
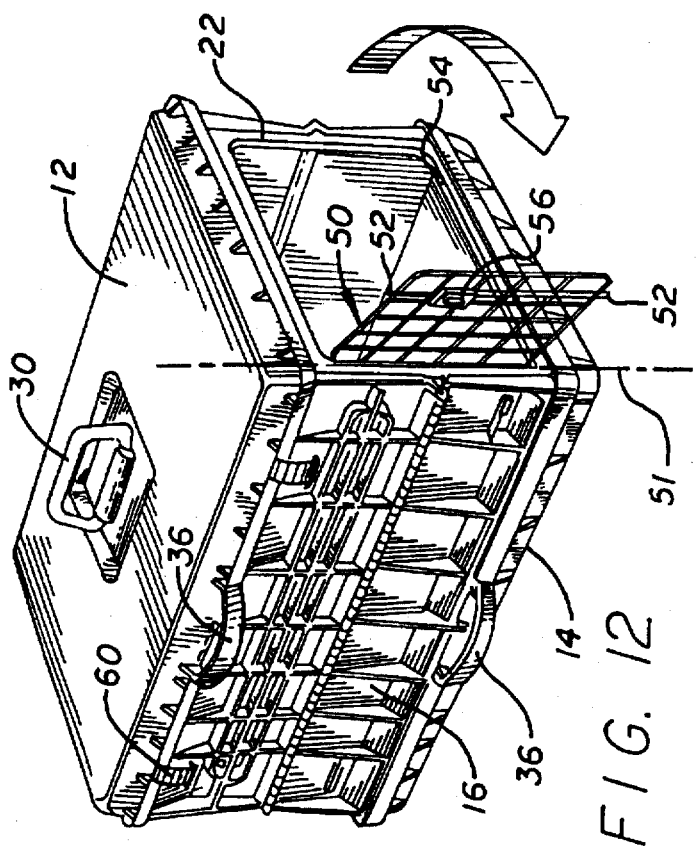

ANIMAL CARRIER

This invention relates to housings for pets. More particularly, the invention relates to collapsible pet housings which can be manually gripped and easily transported or stored when the housings are not in use.

BACKGROUND OF THE INVENTION

There are millions of pets in the United States. This results in part from the belief that pets help a child to grow up. It also results in part from the companionship which pets offer to people of all ages. Many of these pets reside inside of their owners' homes. This is particularly true of cats since cats are fastidious in their habits. However, many of these pets, particularly dogs, reside in housings outside of the homes such as in the backyards of their owners. Housings are generally provided for these pets to protect them from the atmospheric elements such as rain or snow.

The pet housings now in use are generally permanent structures. This makes it difficult for the pet housings to be transported. For example, when a family moves from one location to another, the pet housings cannot be disassembled at the home being vacated and re-assembled at the home being newly occupied. The pet housing thus has to be shipped in its assembled state so that it occupies a considerable amount of space in the van transporting the owners' possessions from the previously occupied home to the newly occupied home.

There are other problems with the pet housings now in use. For example, there are problems with transporting pets by commercial carriers. By way of illustration, when the pets are transported by one of the commercial airlines, the owner has to purchase a housing. For example, the cost of this housing can be in the tens of dollars. For example, the cost of this housing can often exceed fifty dollars ($50) for large dogs. Generally, the pet owners discard the housing at the completion of their trip because of the bulkiness of the housing. This means that the pet owner has to purchase another pet carrier for the next trip.

The problems discussed above have existed for some time, even as long as several decades. Furthermore, the problems have been known by a considerable portion of the population during all of this time. As will be appreciated, a considerable effort has been made, and significant amounts of money have been expended, to resolve this problem. In spite of such efforts and such considerable expenditures of money, the problems discussed above have still not been resolved satisfactorily.

U.S. Pat. No. 3,048,147 issued to J. D. McKean on Aug. 7, 1962, for "Portable Collapsible Shipping Kennel for Animals discloses an expansible and collapsible housing for pets. However, the kennel lacks certain features which would cause the kennel to be adopted by pet owners. For example, the kennel does not provide a satisfactory arrangement for maintaining the kennel in an expanded relationship or for maintaining the kennel in a collapsed relationship. The kennel also provide an arrangement for easily the kennel from an expanded relationship to a collapsed relationship and vice versa.

BRIEF DESCRIPTION OF THE INVENTION

This invention provides a pet housing which can be easily expanded to hold a pet or easily collapsed to the size of a suitcase. When collapsed, the pet housing can be easily transported, particularly since it has a relatively light weight. The pet housing can also be manually transported when expanded even when the pet is inside the housing. The invention also provides a pet housing which can be maintained in the expanded state or in the collapsed state. The pet housing can be manufactured at a relatively low cost so that it is competitive with the fixedly constructed dog houses now on the market. The pet housing of this invention is sturdy when expanded so that it gives the dog confidence when the dog is in the pet housing.

In one embodiment of the invention, a pet housing expansible to hold a pet and collapsible to suitcase size for manual transport includes a pair of platforms and first and second pairs of spaced walls. The walls in the first pair (e.g. front and rear walls) are pivotably attached at opposite ends to the platforms and are hinged at intermediate positions for collapse and expansion. The walls in the second pair (e.g. side walls) are pivotable toward an individual one of the platforms with such platform as a fulcrum to collapse the housing and toward the other platform when the housing is expanded.

In the collapsed housing disposition, detents on opposite sides of the hinge on the first pair of walls releasably engage to maintain the housing collapsed. A manually grippable handle on both of the platforms provides for a transport of the collapsed housing. With the walls in the first pair expanded, detents on the walls in the first and second pairs of housings releasably engage to maintain the expanded housing enclosure. A second handle on one of the platforms is manually grippable to provide for the housing transport in the expanded relationship.

Third detents provide for a releasable closing and opening, preferably on a vertical axis, of a door in one of the second pair of walls. The walls in the first and second pairs are preferably formed from gratings of spaced wires to minimize weight and to provide a circulation of air through the housing from the atmosphere in the expanded housing.

BRIEF DESCRIPTION OF THE DRAWINGS

In the drawings:

FIG. 1 is a schematic perspective view of a person manually carrying a pet housing of this invention with the pet housing in an expanded relationship;

FIG. 2 is a schematic perspective view of a person manually carrying the pet housing shown in FIG. 1 with the pet housing in a collapsed relationship;

FIG. 8 is an enlarged fragmentary top plan view of the housing and shows, in solid lines, handles attached to the top platform of the housing for a manual gripping to transport the housing respectively in either a collapsed or an expanded relationship and additionally shows, in broken lines, handles attached to the platform of the housing when the housing has an increased size;

FIG. 9 is a sectional view taken substantially on the line 9—9 of FIG. 5 and shows a detent arrangement, in an unlocked relationship, on the upper half of the front wall for locking the upper and lower halves of the front wall when the housing is in a collapsed disposition;

FIG. 9A is a sectional view also taken substantially on the line 9—9 of FIG. 5 and shows the detent arrangement of FIG. 9A in the locking relationship when the housing is in a collapsed disposition;

FIG. 12 is a perspective view of the housing in the expanded relationship and of a door in one of the side walls with the door in an open position relative to such side wall; and FIG. 13 is an enlarged fragmentary side elevational view of a detent arrangement for releasably locking the door to the side wall.

DETAILED DESCRIPTION OF THE INVENTION

Figure 3:
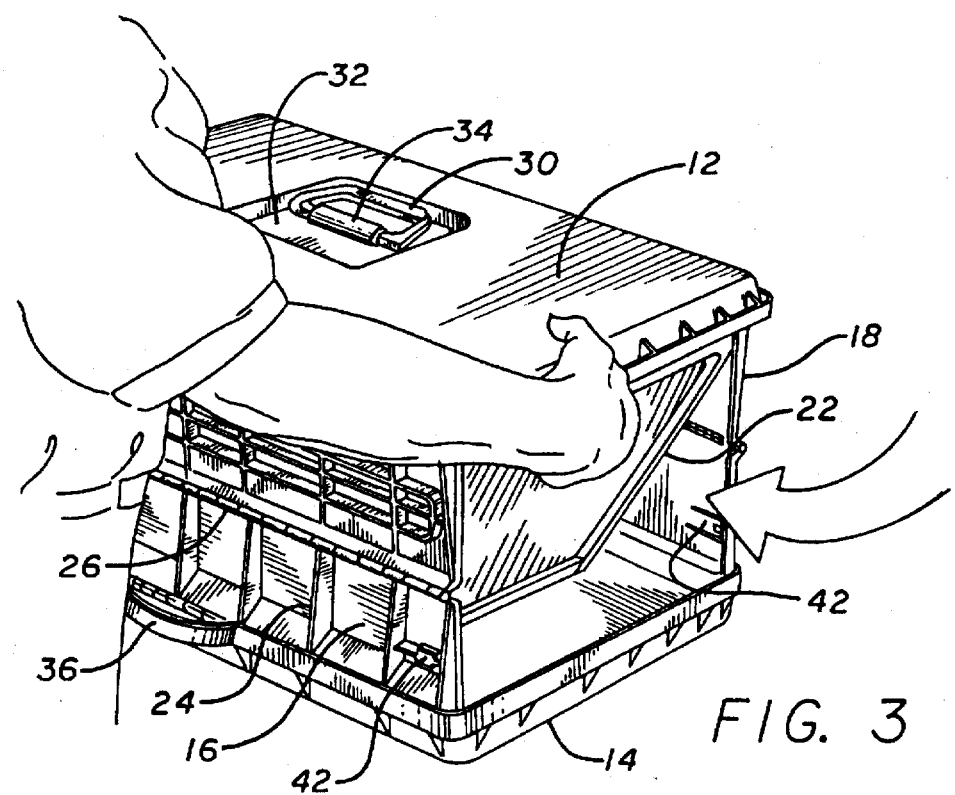
FIG. 3 is a schematic perspective view of the pet housing in the expanded relationship with the hand of a person manually pivoting one of the side walls in the housing upwardly as one of the steps in collapsing the housing.
Figure 4:
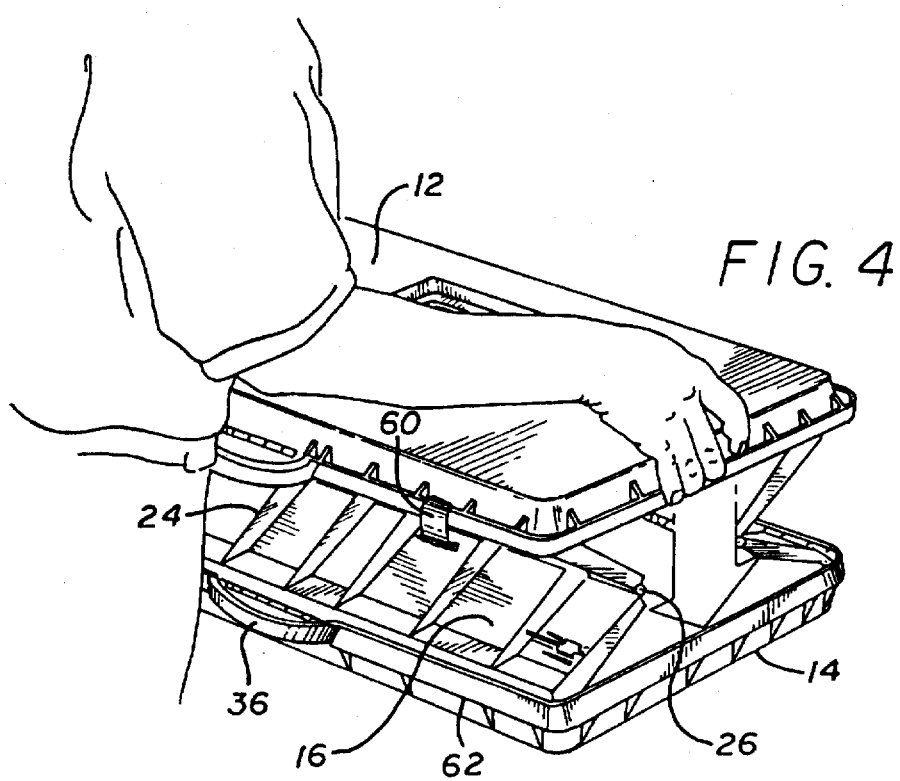
FIG. 4 is a schematic perspective view of the pet housing and shows the housing in a partially collapsed relationship and shows the hand of a person further collapsing the housing.

In one embodiment of the invention, a pet housing generally indicated at 10 is provided with an expanded relationship (FIG. 1) to hold a pet such as a dog and with a collapsed relationship (FIG. 2) to facilitate the manual transport of the housing. The housing 10 includes a top platform 12, a bottom platform 14, a front wall 16, a rear wall 18, a wall 20 on the left side and a wall 22 on the right side.

Preferably the platforms 12 and 14 and the walls 16, 18, 20 and 22 have rectangular configurations to define, in the expanded disposition of the housing 10, a space defined by six (6) peripheries of rectangular configuration. The platforms 12 and 14 and the walls 16, 18, 20 and 22 may be formed from a suitable material such as a thermosetting plastic or a thermoplastic material or from a suitable material such as aluminum.

The platforms 12 and 14 may preferably be formed from a solid material. Each of the front and rear walls 16 and 18 may be provided with spaced ribs 24 extending from one of the wall extremities to a hinge 26. Each of the hinges 26 extends along the length of the associated wall at an intermediate position between the top and bottom of the wall. The upper and lower portions of each of the front and rear walls 16 and 18 are pivotable relative to each other on the hinge 26 as a fulcrum. The pivotal relationship for the front wall 16 is facilitated by a pivot pin 27 disposed on the top platform 12 and a pivot pin 29 disposed on the bottom platform 14. A similar pivotal arrangement is provided for the rear wall 18.

A handle 30 (FIGS. 1, 3 and 8) may be provided on the top platform 12 at a centrally disposed position on the flat surface at the top of the platform 12. Preferably the handle 30 is disposed in a recess 32 in the top platform so that it will be substantially flush with the surface of the platform when not in use. The handle 30 is retained within a retainer 34 for pivotable movement relative to the retainer and the surface of the platform 12 when the housing 12 is to be lifted and transported in the expanded relationship of the housing 10 as shown in FIG. 1.

A handle 36 (FIGS. 2 and 8) is also preferably disposed on one of the side surfaces of the top platform 12 at an intermediate position on such surface. The handle 36 is adapted to be manually gripped to provide for a manual transport of the housing 10 with the housing collapsed as shown in FIG. 2. When the housing 10 is relatively large, a pair of handles 38 (shown in broken lines in FIG. 8) may be disposed at spaced positions on the side surface of the top platform 12. In this way, the handles may be gripped by two (2) people and manually transported by these people.

Each of the side walls 20 and 22 may preferably be formed from a grated material defined by a plurality of horizontally and vertically spaced wires. The grated material helps to decrease the weight of the housing 10 and to provide for air circulation through the housing 10. Each of the side walls 20 and 22 may be pivotably coupled to the bottom of the top platform 12 for pivotal movement on a horizontal axis defined by the bottom of the top platform.

Figure 5:
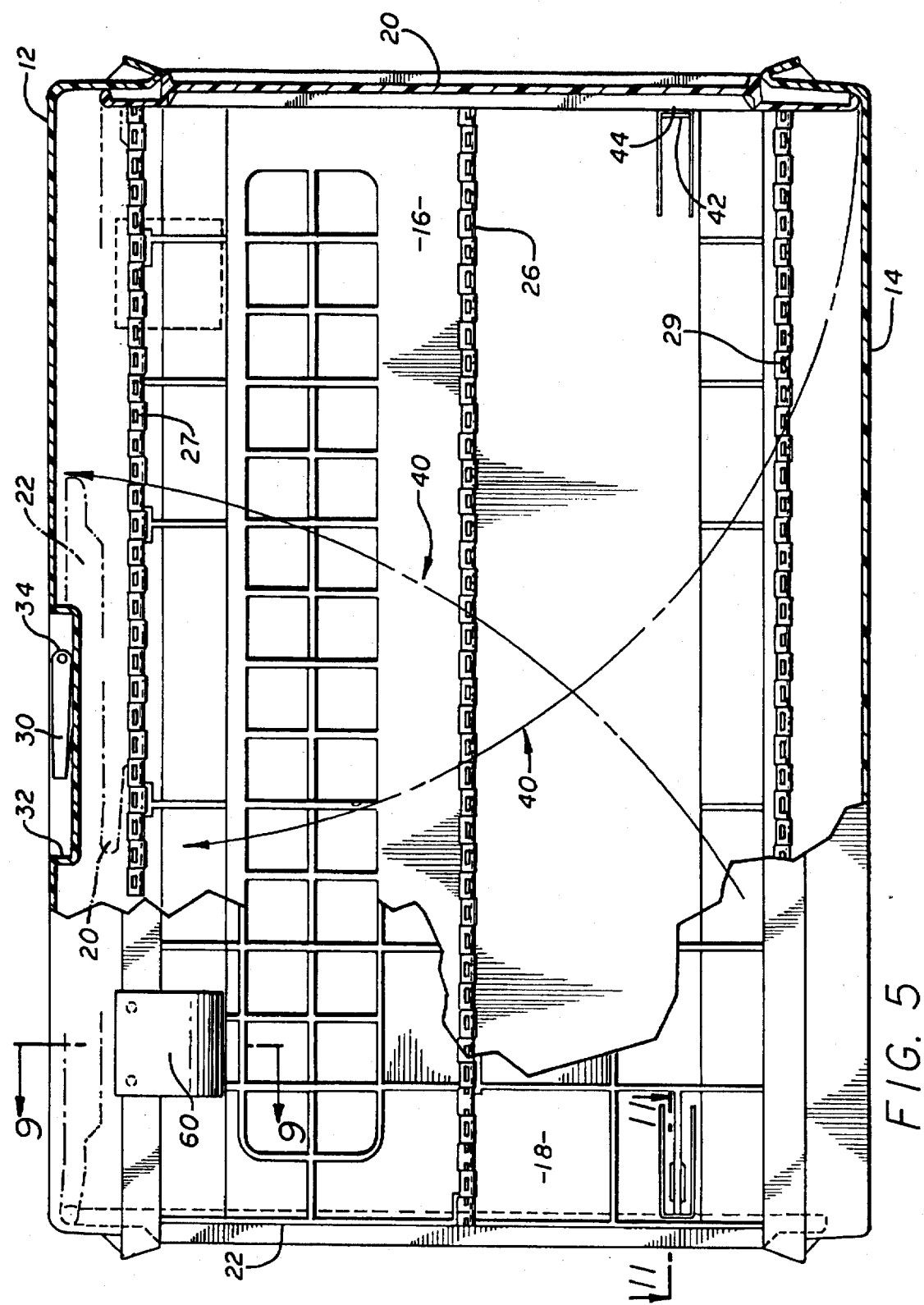
FIG. 5 is a front elevational view of the housing in the expanded relationship and shows a hinged arrangement for providing for a collapse or expansion of the front wall of the housing and additionally shows schematically how the side walls are pivoted upwardly as a step in collapsing the housing.
Figure 6:
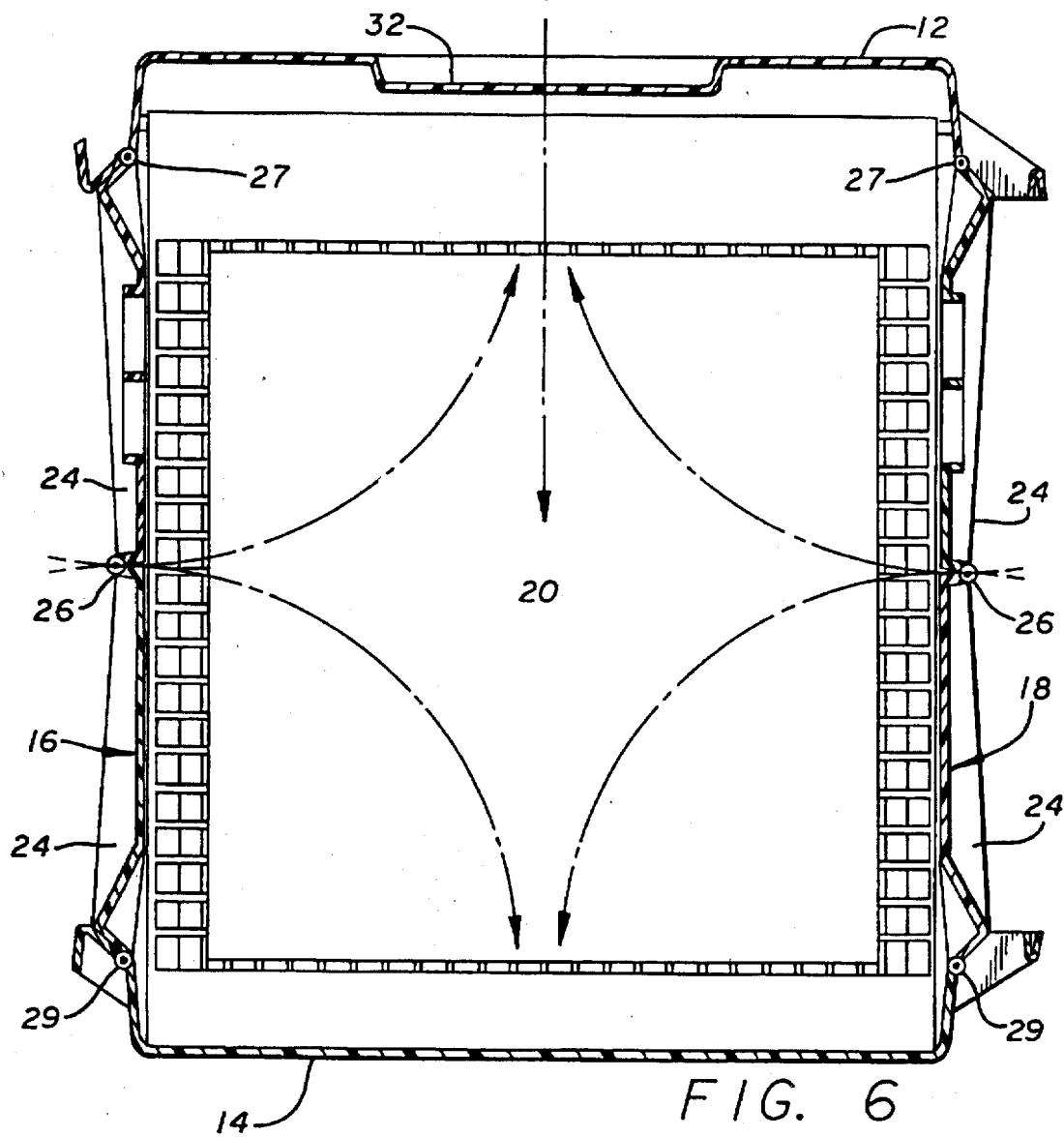
FIG. 6 is a side elevational view of the housing in the expanded relationship and schematically shows the pivotal movements of the upper and lower halves of the front and rear walls about the hinges as a fulcrum to collapse the housing.
Figure 7:
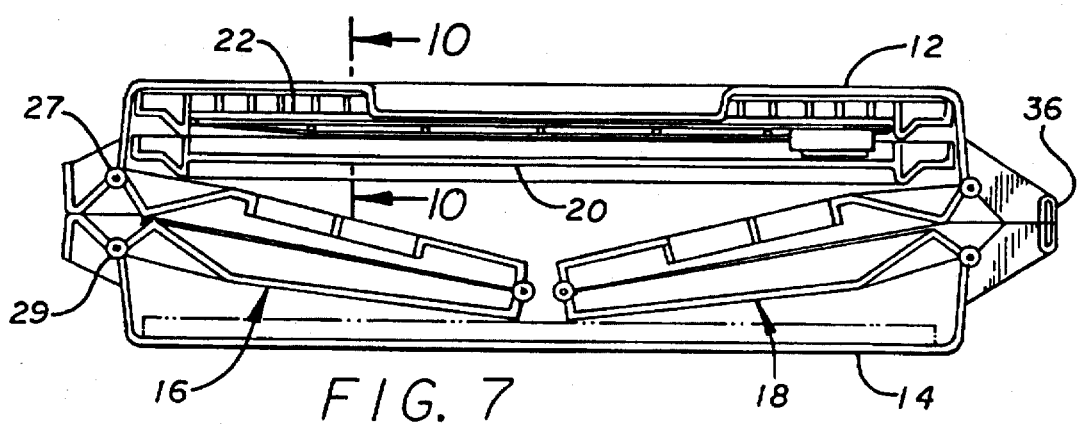
FIG. 7 is a side elevational view of the housing in a collapsed relationship.
Figure 10:
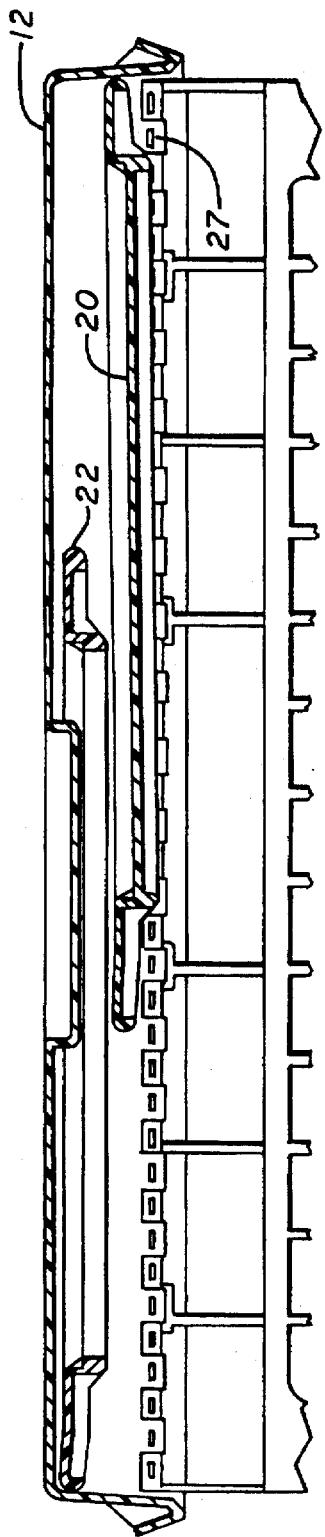
FIG. 10 is a sectional view taken substantially on the line 10—10 of FIG. 7 and shows the disposition of the side walls relative to the front wall and the top platform when the housing is in a collapsed relationship.

The side walls 20 and 22 are disposed in vertically hanging relationship from the top platform 12 when the housing 12 is in its expanded relationship. This is shown in FIG. 1 for the right side wall 22. The side walls 20 and 22 are pivotable upwardly to positions below the top platform 12 as shown schematically in FIG. 3 and as shown in FIG. 10. The pivotable movements upwardly of the side walls 20 and 22 are indicated by arcuately curved arrows 40 in FIG. 5. The upward pivotal movements of the walls 20 and 22 constitute one of the steps in changing the configuration of the housing 10 from the expanded relationship shown in FIG. 1 to the collapsed relationship shown in FIG. 2.

Figure 11A:
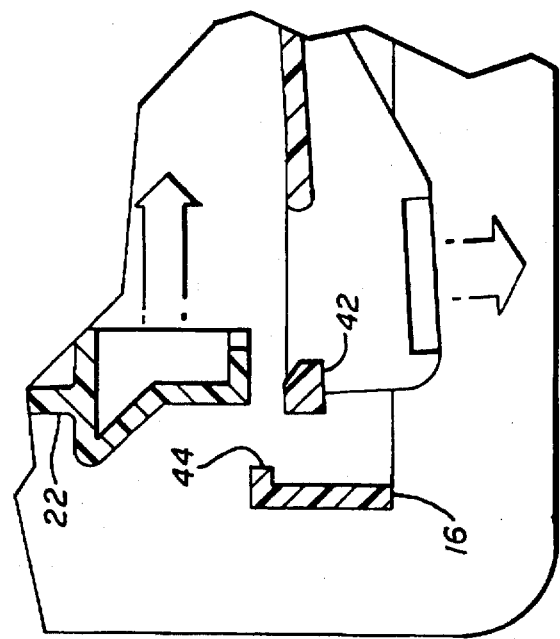
FIG. 11A is a sectional view taken substantially on the line 11—11 of FIG. 5 and shows the relative disposition of the front wall and a side wall when the detents are displaced from the relative positions releasably fixing the side wall to the front wall.
Figure 11:
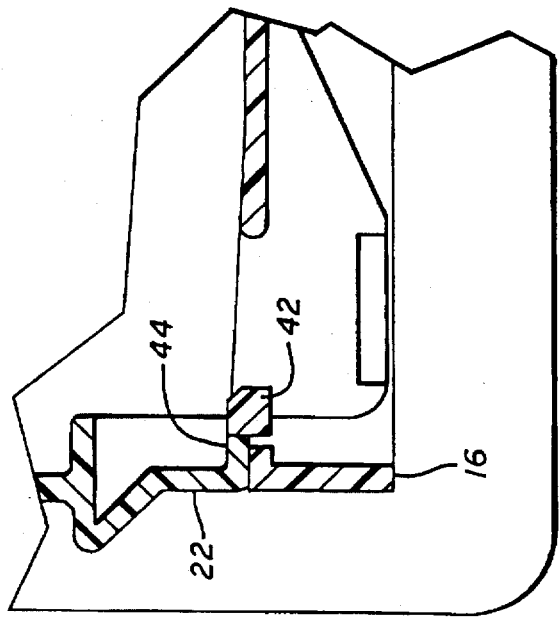
FIG. 11 is a sectional view taken substantially on the line 11—11 of FIG. 5 and shows the relative disposition of detents on the front wall and a side wall when the detents are disposed in relative positions to releasably fix the side walls to the front wall.

When the walls 20 and 22 have the hanging relationship shown in FIG. 1 for the wall 22, the walls 20 and 22 may have a releasably fixed relationship to the front and rear walls 16 and 18. This is shown schematically in FIGS. 11 and 11A. As shown in FIG. 11 for the walls 16 and 22, the wall 22 has a detent 42 which is movable from the unlocked position shown in FIG. 11A to the locked position shown in FIG. 11. At the same time, the front wall 16 may be movable from the decoupled position shown in FIG. 11A to the position shown in FIG. 11 as the front wall is expanded from the partially collapsed position shown in FIG. 11A to the expanded position shown in FIG. 11.

In the expanded position shown in FIG. 11, the detent 42 frictionally engages a detent 44 on the front wall 16. Since the engagement between the detents 42 and 44 is frictional, the relationship between the detents 42 and 44 can be changed from that shown in FIG. 11 to that shown in FIG. 11A by manually exerting a force against the wall 22 to pivot the wall upwardly. A similar arrangement of detents may be provided between the wall 22 and the rear wall, 18 and between the wall 20 and each of the wall 16 and 18.

One or both of the side walls 20 and 22 may include a door 50. In the drawings (FIGS. 1, 12 and 13), the door 50 is shown as being included in the wall 22. The door 50 may be pivotable relative to the wall 22 between open (FIG. 12) and closed (FIG. 1) positions on a pivotable axis. This axis may preferably extend in a vertical direction as shown at 51 in FIG. 12. The door 50 may normally be in the closed position as a result of the extension of fingers 52 (FIG. 12) into sockets 54 in the wall 22. The door 50 may be moved pivotally to the open position as by rotating a knob 56, the rotation causing the fingers 52 to retract from the sockets 54. This releases the door 50 to be opened. When the door 50 is opened, the pet may enter into the housing 10 or exit from the housing. By providing the door 50 and the locking arrangement including the fingers 52 and the sockets 54, an entrance and an exit are provided for the pet without impairing the structural integrity or solidity of the housing 10 when the housing is in the expanded relationship shown in FIG. 1.

Detents 60 (FIGS. 1, 9 and 9A) and 62 are provided on the platforms 12 and 14 respectively above and below the hinges 26. The detents 60 and 62 may be provided at positions near the opposite longitudinal ends of each of the platforms 12 and 14. The detents 60 may be pivotable on pins 66 to engage the detents 62 when the platforms 12 and 14 are in their collapsed relationship.

FIG. 9 shows the detents 60 in an unlocked relationship relative to the detents 62 before the upper and lower portions of each of the platforms 12 and 14 have been collapsed against each other. FIG. 9A shows the upper and lower portions of the platform 12 collapsed against each other. FIG. 9A additionally shows the detent 60 in broken lines before the detent has been moved pivotally on the pin 66 to engage the detent 62. FIG. 9A additionally shows the detent 60 in solid lines with the detent extended over the detent 62 to lock the platform 12 in the collapsed relationship of the housing 10.

The pet housing 10 described above and shown in the drawings has certain important advantages. It provides a sturdy and light-weight construction in the expanded relationship of the housing. In this expanded relationship, the walls 20 and 22 are disposed in releasably fixed disposition relative to the walls 16 and 18 as a result of the operation of the detents 42 and 44 in maintaining the housing 10 in the expanded relationship. Furthermore, in this expanded relationship, the door 50 may be opened as a result of the operation of the fingers 52, the socket 54 and the knob 56 to provide for the entrance of the pet into the expanded housing 10 or the exit of the pet from the expanded housing. The housing can be transported in the expanded relationship by manually grasping the handle 30.

The pet housing can be changed relatively easily from the expanded relationship shown in FIG. 1 to the collapsed relationship shown in FIG. 2. This is accomplished by manually pivoting the walls 20 and 22 upwardly to the position shown in FIG. 10 and collapsing the upper and lower halves of the walls 16 and 18 on the hinges 20 as a fulcrum while holding the walls upwardly against the top platform 12. When the pet housing 10 has been collapsed, the detents 60 and 62 can be locked to each other as shown in FIG. 9A to maintain the housing 10 in the collapsed relationship shown in FIG. 2. In the collapsed relationship, the housing has the configuration of a suitcase so that it can be easily transported by manually grasping the handle 36 for a relatively small housing or the handles 38 for a relatively large housing.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

I claim:

1. In combination in a portable pet housing, top and bottom platforms defining the top and bottom of the pet housing, front and rear collapsible walls each having opposite ends respectively attached pivotably to the top and bottom platforms and hinged at an intermediate position between the opposite ends to provide for a pivotable collapse of such walls against the top and bottom platforms for portable transport of the pet housing in a collapsed relationship and to provide for an expansion of the front and rear walls for use in housing the pet, left and right side walls each pivotably attached to an individual one of the top and bottom platforms to facilitate the collapse of the front and rear walls when such side wall is pivoted toward the individual one of the top and bottom platforms, first detent means disposed on an individual one of the left and right side walls, and second detent means disposed on an individual one of the front and rear collapsible walls and providing a frictional engagement with the first detent means when the side walls are pivoted to positions closing the pet housing.

2. In a combination as set forth in claim 1 wherein the first detent means comprise a first pair of detent means respectively disposed on the left and right side walls and wherein the second detent means comprise a second pair of detent means respectively disposed on the front and rear collapsible walls for frictional engagement with the first and second detent means when the side walls are pivoted to positions closing the pet housing.

3. In a combination as set forth in claim 1 wherein the top and bottom platforms are provided with side surfaces and wherein at least one handle is disposed on one of the side surfaces of the top platform to provide for a manual gripping of the handle for facilitating the portable transport of the pet housing in the collapsed condition of the pet housing.

4. In a combination as set forth in claim 1 wherein the top platform has a handle to provide for a manual gripping of the handle with the front and rear walls in their expanded positions for facilitating the portable transport of the pet housing in the expanded position of the pet housing.

5. In a combination as set forth in claim 2 wherein the top platform has a top surface and side surfaces and wherein at least a first handle is disposed on one of the side surfaces of the top platform to provide for a manual gripping of the handle for facilitating the portable transport of the pet housing in the collapsed condition of the pet housing and wherein a second handle is provided on the top surface of the top platform to provide for a manual gripping of the second handle with the walls in their expanded positions for facilitating the portable transport of the pet housing in the expanded position of the pet housing.

6. In a combination as set forth in claim 5 wherein the platforms are provided with side surfaces and wherein at least one handle is disposed on one of the side surfaces of the top platform to provide for a manual gripping of the handle for a transport of the pet housing in the collapsed condition of the pet housing and with the first and second detent means in the engaged relationship.

7. In a combination as set forth in claim 5, including, third detent means on at least an individual one of the front and rear walls and fourth detent means on the side walls for locking the side walls to the front and rear walls in the expanded positions of the front and rear walls.

8. In a combination as set forth in claim 7 wherein the third detent means provide a frictional engagement with the fourth detent means when the front and rear walls are expanded and the side walls are disposed to close the portable pet housing.

9. In combination in a portable pet housing, top and bottom platforms respectively defining the top and bottom of the pet housing, front and rear collapsible walls each having opposite ends respectively attached pivotably to the top and bottom platforms and hinged at an intermediate position between the opposite ends to provide for a collapse of the front and rear walls against the top and bottom platforms for a portable transport of the pet housing and to provide for an expansion of the front and rear walls for use in housing the pet, left and right side walls each pivotably attached to an individual one of the top and bottom platforms to facilitate the collapse of the front and rear walls when such side wall is pivoted toward such individual one of the top and bottom platforms, first detent means disposed on at least an individual one of the front and rear walls at a position above the hinge in such wall, and second detent means disposed on at least the individual one of the front and rear walls at a position below the hinge in such wall for engaging the first detent means in the collapsed condition of such wall to retain the portable pet housing in the collapsed condition of the front and rear walls, one of the first and second detent means being pivotable relative to the other of the first and second detent means to provide an engagement between the first and second detent means in the collapsed condition of such wall.

10. In a combination as set forth in claim 9 wherein the first detent means comprises a pair of detents disposed at spaced positions on at least the individual one of the front and rear walls at a position above the hinge on such individual one of the front and rear walls and wherein the second detent means comprises a pair of detents disposed at spaced positions on at least the individual one of the front and rear walls at a position below the hinge on such individual one of the front and rear walls for engaging the pair of detents in the first detent means in the collapsed condition of the front and rear walls.

11. In a combination as set forth in claim 10, the top and bottom platforms being provided with side surfaces, at least one handle disposed on one of the side surfaces of the top platform to provide for a manual gripping of the handle for a transport of the pet housing in the collapsed condition of the pet housing and with the first and second detent means in the engaged relationship, and third detent means on at least an individual one of the front and rear walls and fourth detent means on the side walls for locking the side walls to the front and rear walls in a frictional relationship in the expanded positions of the front and rear walls.

12. In combination in a portable pet housing, a first pair of spaced walls hinged at an intermediate position to provide collapsed and expanded relationships of such walls, a second pair of spaced walls disposed in a transverse relationship to the first pair of walls to define an enclosure with the first pair of walls, a pair of platforms disposed in transverse relationships to the first and second pairs of spaced walls to cover the enclosure defined by the first and second pairs of the spaced walls, the pair of platforms being pivotably coupled to the first pair of walls to provide for the collapse and expansion of the first pair of walls and being pivotably coupled to the second pair of walls to provide for a pivotal movement of the second pair of walls between positions defining an opening and closure of the enclosure, and detent means on the first and second pairs of walls for frictionally locking the second pair of the spaced walls to the first pair of the spaced walls in the expanded relationship of the first pair of the spaced walls, the detent means on the first and second pairs of the spaced walls being frictionally releasable to provide for the collapse of the first pair of the spaced walls.

13. In a combination as set forth in claim 12, the second pair of walls having a grated construction defined by spaced members with openings to the atmosphere between the members.

14. In a combination as set forth in claim 13, the detent means constituting first detent means, and second detent means disposed on the first pair of platforms for locking said first pair of the spaced walls against expansion with such walls in the collapsed state, each of the platforms having side surfaces, at least one handle disposed on one of the side surfaces of an individual one of the platforms for providing a manual transport of the portable pet housing in the collapsed state of the walls in the first pair, each of the platforms having flat surfaces, a second handle disposed on the flat surface of one of the platforms for providing a manual transport of the portable pet housing upon the pivoting of the walls in the second pair to the position providing the opening of the enclosure defined by the walls in the first and second pairs, and the first, second and third pairs of walls being substantially perpendicular to one another to define the housing by six (6) rectangles.

15. In a combination as set forth in claim 12, the detent means constituting first detent means, and second detent means disposed on the first pair of walls for locking such walls against expansion with such walls in the collapsed relationship.

16. In a combination as set forth in claim 12, each of the platforms having side surfaces, at least one handle disposed on one of the side surfaces of an individual one of the platforms for providing a manual transport of the portable pet housing in the collapsed relationship of the walls in the first pair.

17. In a combination as set forth in claim 12, the first and second platforms and the walls being substantially perpendicular to one another to define the housing by six (6) rectangles.

18. In combination in a portable pet housing, a first pair of spaced walls hinged at an intermediate position to provide collapsed and expanded relationships of such walls, a second pair of spaced walls disposed in a transverse relationship to the first pair of walls to define an enclosure with the first pair of walls, a pair of platforms disposed in transverse relationship to the first and second pairs of walls to cover the enclosure defined by the first and second pairs of walls, the pair of platforms being pivotably coupled to the first pair of walls to provide for a pivotable collapse and expansion of the first pair of walls and an individual one of the platforms being pivotably coupled to the second pair of walls to provide for a pivotal movement of the second pair of walls between positions adjacent to and displaced from the individual one of the platforms, and detent means for locking the first pair of the spaced walls in the collapsed relationship of the pet housing, the detent means including first and second detent means disposed on one of the walls in the first pair, the first detent means being pivotable relative to the second detent means to lock the first pair of walls to the second pair of walls in the collapsed relationship of the pet housing.

19. In a combination as set forth in claim 17, the first detent means being disposed on the first pair of walls on one side of the intermediate position and the second detent means being disposed on the first pair of walls on the other side of the intermediate position.

20. In a combination as set forth in claim 19, the first and second pairs of walls having a grated construction defined by spaced members with openings to the atmosphere between the wires, the platforms having side surfaces, a handle disposed on one of the side surfaces of one of the platforms to provide for a manual gripping of the handle and a manual transport of the pet housing with the first pair of walls collapsed and the detent means locking the first pair of walls in the collapsed relationship of such walls, and the first and second pairs of the spaced walls and the platforms being substantially perpendicular to one another.

21. In a combination as set forth in claim 18, the first and second pairs of walls having a grated construction defined by spaced members with openings to the atmosphere between the members.

22. In a combination as set forth in claim 18, the platforms having side surfaces, a handle disposed on one of the side surfaces of one of the platforms to provide for a manual gripping of the handle and a manual transport of the pet housing with the first pair of the spaced walls collapsed and the detent means locking the first pair of walls in the collapsed relationship of such walls.

23. In a combination as set forth in claim 18, the first and second pairs of walls and the platforms being substantially perpendicular to one another.

24. In combination in a portable pet housing, a first pair of spaced walls hinged at an intermediate position to provide collapsed and expanded relationships of such walls, a second pair of spaced walls disposed in a transverse relationship to the first pair of walls to define an enclosure with the first pair of walls, a pair of platforms disposed in transverse relationships to the first and second pairs of walls to cover the enclosure defined by the first and second pairs of walls, the pair of platforms being pivotably coupled to the first pair of walls to provide for the pivotable collapse and expansion of the first pair of walls and an individual one of the platforms being pivotably coupled to the second pair of walls to provide for a pivotal movement of the second pair of walls between positions adjacent to and displaced from such individual one of the platforms, the platforms having side surfaces, and a handle disposed on an individual one of the side surfaces of one of the platforms at an intermediate position on such platform to provide for a manual transport of the pet housing with the first pair of walls in the collapsed relationship.

25. In a combination as set forth in claim 24, the handle constituting a first handle, the platforms having flat surfaces respectively defining the top and bottom of the pet housing, and a second handle disposed on the flat surface of one of the platforms to provide for a manual transport of the pet housing with the pet housing in the expanded relationship.

26. In a combination as in claim 25, the platforms having flat surfaces defining the top and bottom of the pet housing and having side surfaces, and a third handle disposed on the flat surface of the one of the platforms in spaced relationship to the second handle to provide for a manual transport of the pet housing with the pet housing in the expanded relationship.

27. In a combination as set forth in claim 26, detent means disposed on at least one of the walls in the first pair for fixedly positioning the walls in the first and second pairs with the walls in a collapsed relationship and with the walls in the second pair adjacent the individual one of the platforms.

28. In a combination as set forth in claim 27, first and second detent means respectively disposed on the walls in the first and second pairs for retaining the walls in the second pair in a frictional relationship with respect to the walls in the first pair with the walls in the first pair in the expanded relationship and the walls in the second pair displaced from the individual one of the platforms.

29. In a combination as set forth in claim 28, the first and second pairs of walls and the platforms being substantially perpendicular to one another.

30. In a combination as set forth in claim 25, first and second detent means respectively disposed on the walls in the first and second pairs for retaining the walls in the second pair in a frictional relationship with respect to the walls in the first pair with the walls in the first pair in the expanded relationship and the walls in the second pair pivoted to the position displaced from the individual one of the platforms.

31. In combination in a portable pet housing, a pair of platforms respectively defining the top and bottom of the pet housing, the platforms having side surfaces, a pair of collapsible walls each having opposite ends respectively attached pivotably to the platforms and hinged at an intermediate position between the opposite ends to provide for a pivotable collapse of such wall against the platforms for portable transport of the pet housing and to provide for an expansion of such walls for use in housing the pet, a second pair of walls pivotably attached to an individual one of the platforms to facilitate the collapse of the collapsible walls when the walls in the second pair are pivoted toward the individual one of the platforms, first and second detent means operatively coupled to at least one of the collapsible walls in the pair and respectively disposed on opposite sides of the intermediate position for retaining the collapsible walls in the collapsed relationship, the first detent means being pivotable relative to the second detent means to become engaged with the second detent means in the collapsed relationship of the collapsible walls in the pair, and a handle attached to one of the side surfaces of one of the platforms for providing a manual transport of the pet housing with the collapsible walls in the pair in the collapsed relationship.

32. In a combination as set forth in claim 31, the handle constituting a first handle, the platforms having flat surfaces respectively defining the vertical dimensions of the pet housing in the expanded relationship of the collapsible walls and the side surfaces of the platforms defining the horizontal dimensions of the pet housing, and a second handle disposed on one of the flat surfaces of an individual one of the platforms for providing for the manual transport of the pet housing with the collapsible walls in the pair in the expanded relationship.

33. In a combination as set forth in claim 32, third and fourth detent means respectively disposed on the collapsible pair of walls and on the second pair of walls for holding the walls in the second pair in a frictional relationship against the collapsible walls with the collapsible walls in the expanded relationship.

34. In combination in a portable pet housing, a pair of platforms defining the top and bottom of the pet housing, a pair of collapsible walls each having opposite ends respectively attached pivotably to the platforms and hinged at an intermediate position between the opposite ends to provide for a collapse of such walls against the platforms for a portable transport of the pet housing and to provide for an expansion of such walls for use in housing the pet, a second pair of walls pivotably attached to an individual one of the platforms to facilitate the collapse of the collapsible walls when the walls in the second pair are pivoted toward the individual one of the platforms and to facilitate the retention of the collapsible walls in the expanded relationship when the walls in the second pair are pivoted toward the other one of the platforms, first and second detent means pivotably coupled respectively to the pair of collapsible walls and to the second pair of walls for positioning the walls in the second pair against the pair of collapsible walls in a frictional relationship when the walls in the second pair are pivoted toward the other one of the platforms, the platforms having flat surfaces defining the vertical dimensions of the pet housing, and a handle disposed on one of the flat surfaces of an individual one of the platforms for manual gripping to obtain a transport of the pet housing when the collapsible walls are in their expanded relationship and the walls in the second pair are fixedly retained by the detent means against the collapsible walls.

35. In a combination as set forth in claim 34, the platforms having additional surfaces defining the horizontal dimensions of the pet housing, the handle constituting a first handle, and a second handle disposed on one of the additional surfaces of one of the platforms for manual gripping to provide a manual transport of the pet housing with the collapsible walls in the collapsed relationship.

36. In a combination as set forth in claim 35, a third handle disposed on the one of the flat surfaces on the individual one of the platforms in spaced relationship to the first handle for manual gripping of the first and third handles to obtain a transport of the pet housing with the collapsible walls collapsed and with the walls in the second pair pivoted toward the individual one of the platforms.

37. In a combination as set forth in claim 36, the collapsible walls and the walls in the second pair being formed from a grating defined by members spaced from one another and open to the atmosphere.

38. In a combination as set forth in claim 36, third and fourth detent means disposed on at least one of the collapsible walls and respectively disposed on opposite sides of the intermediate position for holding the collapsible walls in the collapsed relationship, the third detent means being pivotable into an engaging relationship with the fourth detent means with the collapsible walls in the collapsed relationship.

39. In combination in a portable pet housing, a pair of platforms defining the top and bottom of the portable pet housing, a pair of collapsible walls each having opposite ends pivotably attached to the platforms and each hinged at an intermediate position between the opposite ends to provide for a pivotable collapse of such walls against the platforms for portable transport of the pet housing in a collapsed relationship and to provide for an expansion of the collapsible walls for use in housing the pet, a pair of pivotable walls each pivotably attached to an individual one of the top and bottom platforms to facilitate the collapse of the collapsible walls when such pivotable wall is pivoted toward the individual one of the top and bottom platforms, first and second detent means respectively disposed on the collapsible walls and the pivotable walls for providing a frictional relationship between the collapsible walls and the pivotable walls when the collapsible walls are in their expanded relationship and the pivotable walls are pivoted to the other one of the platforms, the frictional relationship being removed when the pivotable walls are pivoted toward the individual one of the platforms, a door disposed on an individual one of the pivotable walls for pivotal movement relative to an individual one of the pivotable walls with the collapsible walls in the expanded relationship and with the pivotable walls pivoted to the other one of the platforms, and third and fourth detent means for releasably detaining the door in a closed relationship with respect to such individual one of the pivotable walls and for providing for a release of such detention with the collapsible walls in the expanded relationship and with the pivotable walls pivoted to the other one of the platforms.

40. In a combination as set forth in claim 39, fifth and sixth detent means respectively disposed on the collapsible walls on the opposite sides of the intermediate position for releasably retaining the collapsible walls in the collapsed relationship.

41. In a combination as set forth in claim 39, the pivotable walls being attached to the individual one of the platforms for pivotable movement on a first axis, the door being attached to the individual one of the pivotable walls for pivotable movement on a second axis transverse to the first axis.

42. In a combination as set forth in claim 39, the platforms, the collapsible walls and the pivotable walls being disposed in a perpendicular relationship to one another to define an enclosure with six (6) rectangular sides, the collapsible walls and the pivotable walls defining openings to the atmosphere to provide for the introduction of air into the pet housing.

43. In a combination as set forth in claim 39, the third and fourth detent means including a movable finger on the door and a socket in the individual one of the pivotable walls to receive the movable finger in the closed position of the door and the third and fourth detent means including means for moving the finger between a first position in the socket and a second position removed from the socket.

* * * * *